United States Patent [19]

Stoltenberg

[11] 4,033,873
[45] July 5, 1977

[54] FILTRATION APPARATUS AND PRESSURE SEAL

[75] Inventor: Donald A. Stoltenberg, Park Ridge, Ill.

[73] Assignee: Pureco Systems, Inc., Rosemont, Ill.

[22] Filed: May 14, 1973

[21] Appl. No.: 359,646

Related U.S. Application Data

[63] Continuation-in-part of Ser. No. 332,596, Feb. 15, 1973, Pat. No. 3,870,585.

[52] U.S. Cl. .................... 210/186; 210/DIG. 15; 210/232; 210/398
[51] Int. Cl.² .......................................... B01D 35/18
[58] Field of Search .......... 210/401, 387, DIG. 15, 210/186, 232, 398; 159/16, 4 A

[56] References Cited

UNITED STATES PATENTS

| | | | |
|---|---|---|---|
| 2,537,759 | 1/1951 | Hersberger | 210/DIG. 15 |
| 3,206,396 | 9/1965 | Davis | 210/DIG. 15 |
| 3,335,862 | 8/1967 | Hirs | 210/387 X |
| 3,478,888 | 11/1969 | Moore | 210/401 X |
| 3,672,507 | 6/1972 | Paull, Jr. | 210/387 |
| 3,870,585 | 3/1975 | Kearns et al. | 159/4 A |

Primary Examiner—Theodore A. Granger
Attorney, Agent, or Firm—Tilton, Fallon, Lungmus, Chestnut & Hill

[57] ABSTRACT

The gasket-engaging sealing rim of the solids collection vessel of a filtration apparatus is provided with means for cooling its gasket-engaging surface to a stream condensing temperature, and means is provided to direct a flow of steam or other source of water vapor over the gasket-engaging surface while the surface is disengaged from the gasket during discharge of filtered solids, thereby wetting the surface while it is exposed to the atmosphere. This wetting of the surface prevents the accumulation of solids on the surface by the evaporative drying thereon of filtrate solutions, which may come in contact with the surface during the filtration operation.

2 Claims, 4 Drawing Figures

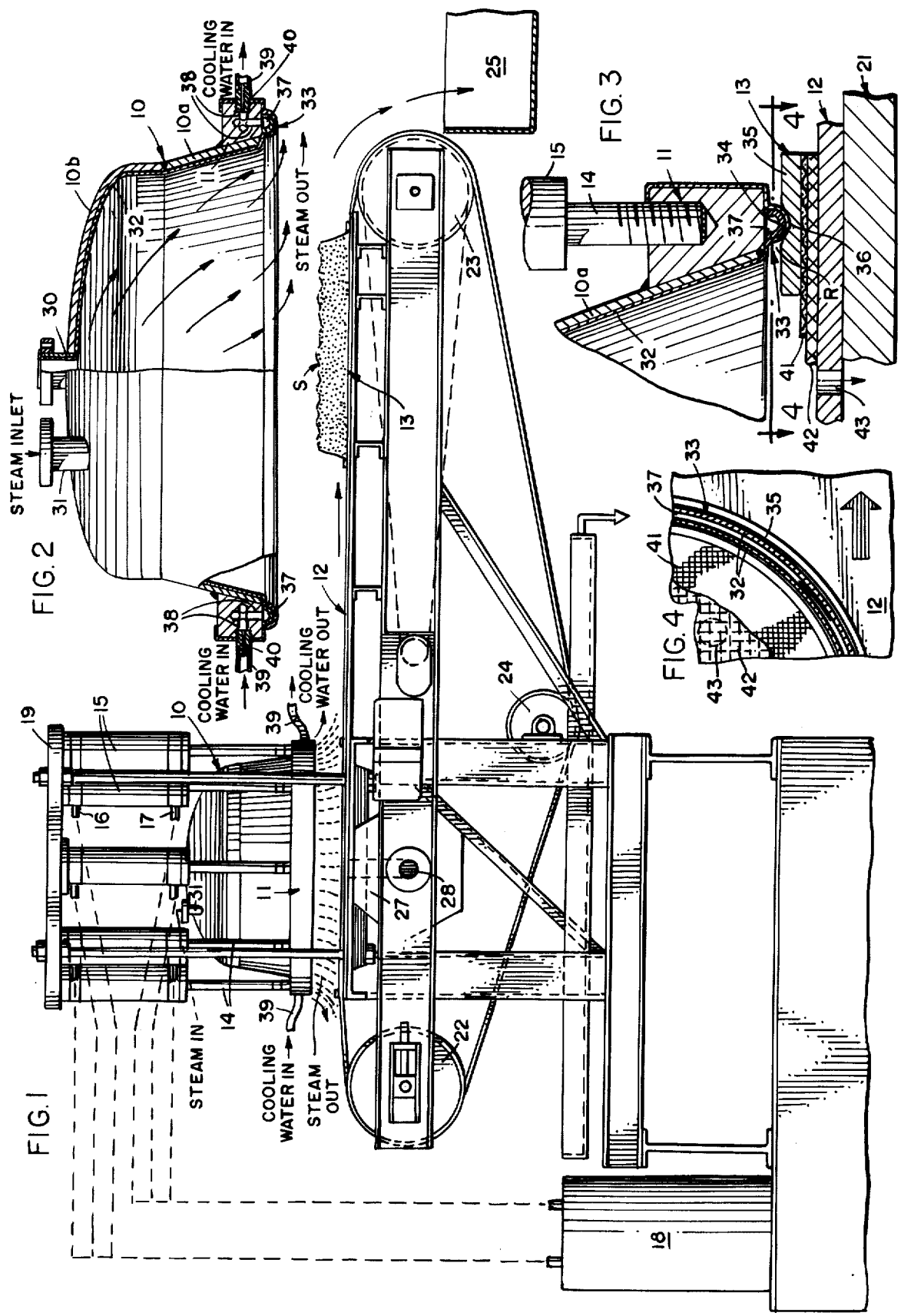

FILTRATION APPARATUS AND PRESSURE SEAL

CROSS-REFERENCE

This application is a continuation-in-part of co-pending application Ser. No. 332,596, filed Feb. 15, 1973 now U.S. Pat. No. 3,870,585. The benefit of the filing date of said co-pending application is hereby claimed.

THE PROBLEM

With pressure filters, such as belt-type filters, it is necessary to press the solids collection vessel against the filter belt with considerable force in order to assure a liquid-tight seal during the pressure filtration. Usually, a gasket of compressible non-metallic material is provided around the filter, which may comprise an integral part of the belt, and the solids collection vessel is provided with a metal sealing rim which engages the gasket. Hydraulic cylinders may be used for moving the vessel into and out of engagement with the belt, and maintaining sealing pressure between the rim and gasket during filtration. With such filters, which operate intermittently between filtration and discharge cycles, the sealing rim of the filter is necessarily separated from the gasket and exposed to the atmosphere during the discharge cycle. When hot liquors are being filtered, the filter components including the vessel tend to become hot — approaching the temperature of the solution being filtered. The elevated temperature accelerates evaporative drying of the sealing surfaces when exposed to the atmosphere. Where the sealing rim has come in contact with solutions of the solids being filtered, which is virtually impossible to completely prevent, the solution can evaporate on the sealing surface of the rim, causing solids to be deposited thereon. During the repeated filtration and discharge cycles, such accumulation of solids can build up to an extent that it interferes with the sealing engagement of the rim and gasket. This may prevent a completely liquid-tight seal from being obtained, causing leakage, or if the pressure is sufficient to maintain the seal, notwithstanding the accumulated solids, the sealing gasket may distorted or damaged by virtue of the sealing pressure exerted by the hydraulic cylinders. This can occur even though limit controls are used on the hydraulic cylinders which close the filter.

While the problem just described is particularly acute for the separation of water-soluble solids from saturated water solutions thereof, a similar problem can occur with the separation of solids from organic solvents which are saturated with the solids. Further, even where the water or other solvent in which the solids are suspended does not contain dissolved solid material, the sealing rim of the solids collection vessel may still be subject to the accumulation of solids. In the discharging of filtered solids, some of the solid material may come in contact with the sealing rim, and become attached thereto to form interfering deposits, which can cause a sealing problem of the kind described.

This invention therefore has as its general object the protection of the sealing flanges of pressure filters from the accumulation of solids which would interfere with the obtaining of a pressure-tight liquid seal. A more specific objective is to prevent the drying of a saturated solution, such as a water solution of the solids being filtered, on the sealing rim during the discharge cycle of the filter in which the sealing flange is exposed to the atmosphere. Further objects and advantages will be indicated in the following description.

Summary of Invention

In accordance with the present invention, means are provided for cooling the gasket-engaging surface of the sealing rim of the pressure filter to a water vapor condensing temperature. Means are also provided for directing a flow of steam, or other source of water vapor, over the gasket-engaging surface while the surface is disengaged from the gasket to condense water on the surface for wetting the surface. By this means, the accumulation of dry solids on the sealing surface is substantially prevented. In particular, where the sealing surface is exposed to a saturated water solution of the solids, the surface is maintained in a wet condition while it is exposed to the atmosphere during the discharge of filtered solids by the combination of steps wherein the sealing surface is cooled to a steam condensing temperature, and a stream of water vapor, preferably as saturated steam, is directed over the surface to condense water thereon. Depending on the extent of cooling, the amount of steam directed over the surface, and the length of time involved, sufficient water can be condensed to effectively wash the sealing surface. However, for the reasons indicated, substantial benefits can be obtained by merely condensing sufficient steam on the sealing surface to maintain the surface in wet condition. The steam will in effect apply a metered amount of water to the sealing surface, forming a water film thereon, which will prevent the surface from accumulating dry solids. Further, in the preferred use, any saturated water solution of the solids being filtered which is on the sealing surface or comes in contact therewith during the discharge cycle of the filter is thereby prevented from drying with the resulting deposit of solids on the sealing surface. Consequently, in this preferred use, only a very moderate amount of cooling and a small amount of steam is required to protect the sealing surface. For other applications the amount of condensate can be increased to give a washing action.

THE DRAWING

The invention is shown in an illustrative embodiment in the accompanying drawings, in which FIG. 1 is a side elevational view of a belt-type pressure filter of the kind with which the present invention can advantageously be used;

FIG. 2 is a side elevational view, partly in section, of the filter vessel of the apparatus of FIG. 1, the improvement of the present invention being incorporated therein;

FIG. 3 is an enlarged fragmentary sectional view showing the engagement between the sealing rim and the sealing gasket; and FIG. 4 is an enlarged fragmentary sectional view taken on line 4—4 of FIG. 3, and showing the means for cooling the sealing rim.

DETAILED DESCRIPTION

Since the present invention has particular application to belt-type filters, this mode of practicing the present invention is illustrated in the accompanying drawing. However, it will be apparent to those skilled in the filtration art that the invention can be applied to any filtration apparatus wherein the solids-collecting vessel is provided with a sealing rim for engaging a gasket around the filter member.

Referring first to FIG. 1, there is shown a belt-type filtration apparatus which includes a receiver vessel 10 for collection of the solids during filtering. The vessel 10 includes a support ring 11, which extends around the open side thereof. As shown, the open side of the vessel comprises the bottom side, the vessel 10 being designed to move upwardly and downwardly, into and out of engagement with a continuous belt 12 carrying a filter assembly 13.

A series of vertically oriented piston rods 14 connect to support ring 11 and are arranged to be actuated by the hydraulic cylinders 15 with which they respectively cooperate. The cylinders are provided with the usual fluid connections 16 and 17 at each end thereof, which are supplied with fluid from a hydraulic motor unit 18, as indicated by the dotted lines, which schematically represent the hydraulic fluid pipe connections to the cylinders.

As shown, the cylinders 15 are suspended from an overhead mounting plate 19 which is mounted by means of rods 20 on a support table 21 over which the continuous belt 13 travels. The support structure for table 21 is indicated in general, but is not directly related to the invention, and therefore will not be described in detail herein.

In FIG. 1, receiver vessel 10 is shown in its raised position with the piston rods 14 retracted within the cylinders 15. This is the position of the vessel during the removal of solids from the filter in which the collected solids stay on the belt when vessel 10 is raised.

After the upward raising of vessel 10 which effects the discharge of the collected solids, belt 12 is rotated in the direction indicated by the arrows conveying the solids S (as indicated in FIG. 1) to a container or storage at 25. As shown, the belt 12 travels over end rollers 22 and 23 and lower roller 24. Either or both rollers 22 and 23 may be driven by a motor. As shown, the solids S, have been conveyed by the belt 12 from beneath vessel 10 toward the outer end of the belt for discharge, such as into a container as indicated at 25.

On its return run, the belt 12 may pass through a wash pan 26, as indicated. The filter assembly 13 will thereby be washed free of solids for the next filtration cycle in which it is positioned beneath vessel 10. During filtration, the liquid passing through filter section 13 collects in a pan 27, and is just discharged through a filtrate outlet 28. Since these elements do not form part of the present invention, and are well known in the filtration art, they will not be described in detail herein.

Turning now to the invention, particular reference may be had to FIGS. 2, 3 and 4 of the drawing. As shown in FIG. 2, the receiver vessel 10 includes a lower conical portion 10a and an upper dome portion 10b. At the center of dome 10b is an inlet 30. A further inlet 31 is provided in dome 10b. To adapt receiver vessel 10 for use with acid solutions, such as sulfuric acid solutions, it may be provided with a lead lining 32, which covers the complete interior and extends upwardly through the inlets 30 and 31, as indicated.

As shown in FIGS. 2 and 3, support ring 11 extends around the lower end of conical vessel portion 10a and is united thereto by welding. The piston rods 14 may be threadedly connected thereto, as shown in FIG. 3.

In accordance with the present invention, means are provided for cooling the gasket engaging surface of the sealing rim 33 which extends around the periphery of the open bottom of vessel 10. As shown, sealing rim 33 is of annular configuration, and is mounted on the bottom surface of support ring 11, being united thereto by welding, as indicated. The lower surface 34 of rim 33 comprises the sealing surface which engages gasket 35. As shown in FIG. 3, rim surface 34 is pressed into engagement with an annular recessed portion 36 of the gasket by the action of the piston rods 14 and hydraulic cylinders 15, as shown in FIG. 3.

In the preferred mode of practicing the present invention, sealing rim 33 and more particularly the sealing surface 34 are cooled by indirect heat exchange, a fluid passage being provided within the rim 33, or adjacent thereto within support ring 11, and means are provided for circulating cooling fluid through the passage. As shown, rim 34 is hollow, providing a continuous annular passage 37 in heat exchange relation with the outer surfaces of the rim, including particularly surface 34. Connections for circulating water or other suitable cooling fluid through passage 37 can be provided as shown in FIG. 2. Within support ring 11 on each side thereof right angle bore passages 38 are formed. The outwardly extending section of these passages communicates with flexible hose members 39 which have metal end portions 40 threadedly connected within the passage 38, as shown. The downwardly extending leg of the passages 38 communicates with the passage 37 within rim 33. As indicated in FIG. 2 and also in FIG. 1, cooling water can thereby be introduced on one side of the filter vessel, for divided flow in each direction around rim 33, passing through passage 37, and out through the passages 38 on the other side, thereby cooling rim 33 and gasket-engaging surface 34. For the purpose of the present invention, the temperature of the cooling water is not particularly cirtical. Ordinary tap water can be used at temperatures ranging from 50° to 80° F.

As indicated in FIG. 2 and also in FIG. 1, the steam for condensation on rim 33 can conveniently be introduced through inlet 31 in the top of vessel 10. After the filtered solids have been discharged from vessel 10, and during the period when vessel 10 is elevated above belt 12, steam can be continuously admitted through inlet 31, flowing downwardly and outwardly within the interior of vessel 10, as indicated by the arrows in FIG. 2, and passing outwardly through the open bottom thereof around the rim 33 in contact with the outer surfaces thereof, such as the bottom surface 34. This outward flow of steam is also indicated in FIG. 1. The steam is preferably in a form in which it is readily condensible at atmospheric pressure, saturated steam therefore being preferred to super-heated steam. Saturated steam at 5 to 10 psig can be introduced from a source thereof through a suitable valve controlled pipe connection to the inlet 31.

Sealing rim 33 is preferably formed of metal, particularly where the outer surfaces thereof are cooled by indirect heat exchange, as described above. Where the vessel 10 has a protective lining, such as the lead lining 32, the protective lining can extend around and over the rim 33, as shown, the outer surface of the protective cover around the rim becoming the steam condensing surface, which directly engages the gasket 35. The gasket 35 is preferably formed of a compressible non-metallic material, such as synthetic rubber, which may be an acid resistant type of rubber, where the slurry being filtered contains an acid, such as sulfuric acid. The filter assembly 13 may also include a fine filter cloth 41, which comprises a filter capable of retaining the solids while passing the liquid. For example, the filter member 41 may be formed of a woven polypropylene filter cloth. To provide support for the filter cloth 41 and to facilitate liquid drainage, a drainage mesh 42 may be provided as the next lower layer, in turn being supported by the filter belt 12, and the table 21. For liquid drainage, filter belt 12 in the area beneath filter cloth 41 may be provided with a plurality of distributed perforations 43. Drainage mesh 42 can be formed of polypropylene.

With respect to the rest of the apparatus described, the materials of construction are not particularly critical for the purpose of the present invention. Most of the elements, such as vessel 10 and support ring 11 can be formed of steel or other suitable metal.

Operation

In the operation of the filtration apparatus shown in the drawing, the slurry to be filtered will be introduced through the inlet 30 into the interior vessel 10. During filtration, it will be understood that rim 33 will be in sealing engagement with gasket 35, as shown in FIG. 3. The slurry which will be introduced under pump pressure will therefore maintain a pressure within vessel 10, which will cause the liquid portion of the slurry to pass through the filter cloth 42, and the perforations 43 in belt 12 into the collector pan 27 for removal through filtrate outlet 28. During this portion of the filtration cycle, the inlet 31 will be closed. After the solids have built up to the desired extent within vessel 10, the introduction of the slurry will be discontinued. The next stage of the filtration is ordinarily referred to as the "blow heel" stage, wherein high pressure air (30 to 50 psig) is introduced through inlet 31 for the purpose of forcing most of the residual liquid in the vessel 10 through the filter cake and into the collector pan 21. After all of the liquid easily filterable has been forced through the filter cake, the introduction of the high pressure compressed air is usually continued for several minutes for the purpose of further drying the filter cake. On completion of this step, since there will be residual compressed air in vessel 10, it is necessary to open inlet 31 to the atmosphere for the purpose of venting the pressure within the vessel. When the pressure in vessel 10 is reduced to essentially atmospheric pressure, the vessel is raised by means of the hydraulic cylinders 15. At the same time, purge air can be introduced through inlet 31, the purge air serving to preclude the filter cake from riding up with vessel 10, thereby keeping all of the filtered solids S on the belt 12.

As soon as the vessel 10 has been elevated above belt 12 leaving the filter cake on the belt, the circulation of cooling water through the sealing rim 33 will be started. Simultaneously therewith, saturated steam is preferably introduced through inlet 31 for flow downwardly within vessel 10 and outwardly through the open bottom thereof around the exterior surfaces of the rim 33. Because of the continuous indirect cooling of these surfaces, steam will condense thereon, and keep the sealing surface of the rim continuously wet while vessel 10 is raised and rim 33 exposed to the atmosphere. This will prevent the accumulation of solids on the sealing surface of the rim by the drying of a solids thereon. For example, where the slurry being filtered contains a saturated water solution of the solids being recovered by the filtration, at least some of the saturated water solution will come in contact with the inner portion or rim 33 and the adjacent portion of gasket 34. Even with the use of a drying air stage, as described, it is difficult to prevent traces of the saturated solution from remaining in the area indicated by the letter R in FIG. 3. Consequently, on separation of the sealing surface 34 from the cooperating gasket surface 36, the traces of residual liquid can come into contact with the sealing surface 34. During repeated filtration cycles, the drying of such small amounts of saturated solution of the sealing surface can produce an accumulation of solids or "scale." By means of the present invention, however, the accumulation of such solids or scale can be prevented. In effect, therefore, the combination of the cooling of the sealing rim and the flow of steam thereover performs an anti-scaling function with respect to the sealing surfaces.

As described in copending application Ser. No. 332,596, cross-referenced above, the filtration apparatus of this invention, including the anti-scaling feature thereof, is particularly useful in the filtration of concentrated solutions of spent pickling liquors, such as aqueous sulfuric acid pickling liquors, containing metal sulfate solids, such as ferrous sulfate, zinc sulfate, etc. The slurry being filtered may contain from 5 to 40% by weight of such solids, while the liquid portion may comprise aqueous sulfuric acid of a concentration of from 10 to 30% by weight. The aqueous sulfuric acid phase will be saturated with the dissolved metal salts, such as the iron and zinc salts. Without the present invention, it was found that such metal salts accumulated on the sealing surfaces, such as the surface 34 of rim 33, and interferred with the pressure seal between the rim and gasket. When the anti-solids accumulation feature of the present invention is employed, however, such pickle liquor slurries can be filtered for many filtration cycles without the accumulation of such solids on the sealing surfaces.

For simplicity, the hose and pipe connections to the inlets 30 and 31 have not been shown. However, it will be understood that flexible hoses will be connected to the inlets 30 and 31 to permit the up and down movement of the vessel 10, and that these hoses in turn can be connected to stationary piping and valve assemblies supported independently of the vessel 10. By suitable multiple pipe and valve connections (not shown) to the flexible hose in communication with inlet 31, this inlet can be used for the various purposes described above, that is, the introduction of blow down and drying air, the venting of the interior of vessel 10 to the atmosphere, the introduction of purge air, and the introduction of steam, which for the purpose of the present invention is the most important.

While the water vapor employed for the purpose of this invention is preferably saturated steam, other sources of water vapor can be utilized. For example, air can be passed through water sprays to saturate it with water vapor, and, if a greater water content is desired, the air can be heated. Such air saturated with water vapor can be introduced in the same manner as previously described for the saturated steam, that is, being supplied to filter inlet 31 by means of an air blower.

Where the slurry being filtered is at an elevated temperature, such as 175° to 210° F., the filter 10 and its components, including support ring 11 and sealing rim 33, will be heated to a corresponding temperature. Such higher temperatures will promote the evaporation of the water or other solvent from the liquid coming in contact with the sealing rim. The apparatus and method of the present invention are therefore particularly advantageous for filtering heated slurries, and particularly slurries containing saturated water solutions of inorganic salts, such as ferrous sulfate, zinc sulfate, sodium sulfate, etc. Metal sulfate salts in particular may exhibit reverse solubility, so that solutions of such salts on heated surfaces may have greater tendencies to deposit solids thereon, and therefore this invention is particularly useful for the filtration of heated solutions of reverse solubility salts. However, it will be apparent to those skilled in the art, that the apparatus and method of this invention can be applied to a wide variety of filtration operations, including organic solvent slurries, particularly organic solvents which are water-miscible, and water or organic solvent suspensions of solids, which are not appreciably soluble in the solvent. As explained above, the amount of water vapor condensing on the sealing surface may be increased to give a washing or run-down effect, which can prevent the accumulation of solids from all such slurries and filtrates.

I claim:

1. Pressure filtration apparatus for removing solids from a saturated water solution thereof, including receiver vessel means for collection of the solids during pressure filtering, said vessel having an open bottom through which the solids are discharged, liquid-passing solids-retaining filter means cooperating with said open bottom to close it during filtration and open it for discharge of the collected solids, said filter means having gasket means around the periphery thereof, and sealing rim means extending around said open bottom for engagement with said gasket means during filtration, wherein the improvement comprises: the gasket engaging surface of said sealing rim means being formed of metal and said sealing rim means being provided internally with passage means in heat transfer relation with the inside of said metal gasket engaging surface, means for circulating cooling fluid through said passage means for cooling by heat transfer said external gasket engaging surface to a steam condensing temperature, means for providing a flow of steam over said external gasket engaging surface while said surface is disengaged from said gasket means and is being cooled by said circulating cooling fluid to condense water on said surface for preventing the drying of said saturated solution thereon, whereby effective sealing engagement between said sealing rim means and said gasket means can be maintained during pressure filtration.

2. The filtration apparatus of claim 1, wherein the improvement is further characterized in that said steam flow providing means comprises means for introducing steam into the interior of said vessel means for flow downwardly within said vessel means and outwardly therefrom through said open bottom for contact with said external gasket engaging surface, said passage means providing a liquid flow passage, and said circulating means providing means for circulating cooling water.

* * * * *